(12) United States Patent
Bischoff

(10) Patent No.: US 10,899,276 B2
(45) Date of Patent: Jan. 26, 2021

(54) MONITORING DEVICE FOR A MOTOR VEHICLE

(71) Applicant: VOLKSWAGEN AKTIENGESELLSCHAFT, Wolfsburg (DE)

(72) Inventor: Klaus Bischoff, Evessen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 15/564,124

(22) PCT Filed: Jan. 21, 2016

(86) PCT No.: PCT/EP2016/051186
§ 371 (c)(1),
(2) Date: Oct. 3, 2017

(87) PCT Pub. No.: WO2016/184579
PCT Pub. Date: Nov. 24, 2016

(65) Prior Publication Data
US 2018/0079360 A1    Mar. 22, 2018

(30) Foreign Application Priority Data

May 20, 2015  (DE) .......................... 10 2015 209 187

(51) Int. Cl.
*H04N 5/00* (2011.01)
*B60R 1/00* (2006.01)
(Continued)

(52) U.S. Cl.
CPC ............. *B60R 1/00* (2013.01); *G09G 3/3208* (2013.01); *H04N 5/23296* (2013.01);
(Continued)

(58) Field of Classification Search
CPC ............ G08G 1/017; G08G 1/16; G08G 1/01; G06G 7/76; B60Q 1/00; G06K 9/32;
(Continued)

(56) References Cited

U.S. PATENT DOCUMENTS 5,289,321 A * 2/1994 Secor ..................... B60K 35/00
                                                          348/118
5,978,017 A * 11/1999 Tino ........................ B60Q 1/52
                                                          348/148
(Continued)

FOREIGN PATENT DOCUMENTS

DE    202005015407 U1    1/2006
DE    102007046971 A1    4/2009
(Continued)

OTHER PUBLICATIONS

Search Report for German Patent Application No. 10 2015 209 187.2, dated Feb. 3, 2016.

(Continued)

*Primary Examiner* — Frank F Huang
(74) *Attorney, Agent, or Firm* — Barnes & Thornburg LLP

(57) ABSTRACT

A monitoring device for a motor vehicle having at least one camera device and a display surface, wherein the camera device is arranged so that a lateral region of the motor vehicle is captured, wherein the monitoring device is embodied so that the recordings of the camera device are displayed on the display surface, wherein the monitoring device is embodied so that the recordings are projected onto a side window of the motor vehicle by projection optics or are displayed on a display on or in the side window.

16 Claims, 2 Drawing Sheets

(51) Int. Cl.
*G09G 3/3208* (2016.01)
*H04N 5/232* (2006.01)

(52) U.S. Cl.
CPC ..... *B60R 2300/20* (2013.01); *B60R 2300/605* (2013.01); *B60R 2300/8046* (2013.01)

(58) Field of Classification Search
CPC .... B60R 1/00; B60R 1/04; B60R 1/12; B60R 2300/306; B60R 2300/8026; B60R 2300/8066; B60R 2001/1253; G06T 3/4038
See application file for complete search history.

(56) References Cited

U.S. PATENT DOCUMENTS

| | | | | |
|---|---|---|---|---|
| 7,583,184 B2* | 9/2009 | Schofield | ................ | B60C 23/00 340/438 |
| 7,825,951 B2* | 11/2010 | Lang | ................ | B60R 1/12 340/438 |
| 8,144,033 B2* | 3/2012 | Chinomi | ................ | B60R 1/00 340/434 |
| 8,305,204 B2* | 11/2012 | Nagamine | ................ | B60Q 9/005 340/435 |
| 8,461,970 B2* | 6/2013 | Birkemeyer | ................ | B60R 1/00 340/12.54 |
| 9,041,806 B2* | 5/2015 | Baur | ................ | B60R 1/00 348/148 |
| 2006/0147264 A1* | 7/2006 | Doran, Jr. | ................ | E01F 9/70 404/73 |
| 2008/0225538 A1* | 9/2008 | Lynam | ................ | B60K 35/00 362/494 |
| 2009/0195652 A1* | 8/2009 | Gal | ................ | B60R 1/00 348/148 |
| 2012/0086808 A1* | 4/2012 | Lynam | ................ | B60K 35/00 348/148 |
| 2014/0092481 A1* | 4/2014 | Hudson | ................ | G02B 5/02 359/630 |

FOREIGN PATENT DOCUMENTS

| | | |
|---|---|---|
| DE | 102008004049 A1 | 7/2009 |
| DE | 102008019732 A1 | 10/2009 |
| DE | 102012002582 A1 | 8/2012 |
| DE | 102012203491 A1 | 9/2013 |
| DE | 102012016773 A1 | 2/2014 |
| WO | 2014206406 A1 | 12/2014 |

OTHER PUBLICATIONS

Search Report for International Patent Application No. PCT/EP2016/051186, dated Mar. 31, 2016.

* cited by examiner

MONITORING DEVICE FOR A MOTOR VEHICLE

PRIORITY CLAIM

This patent application is a U.S. National Phase of International Patent Application No. PCT/EP2016/051186, filed 21 Jan. 2016, which claims priority to German Patent Application No. 10 2015 209 187.2, filed 20 May 2015, the disclosures of which are incorporated herein by reference in their entireties.

SUMMARY

Illustrative embodiments relate to a monitoring device for a motor vehicle.

BRIEF DESCRIPTION OF THE DRAWINGS

The disclosed embodiments will be explained in more detail below with reference to the drawings. In the figures.

DETAILED DESCRIPTION

Figure 1:
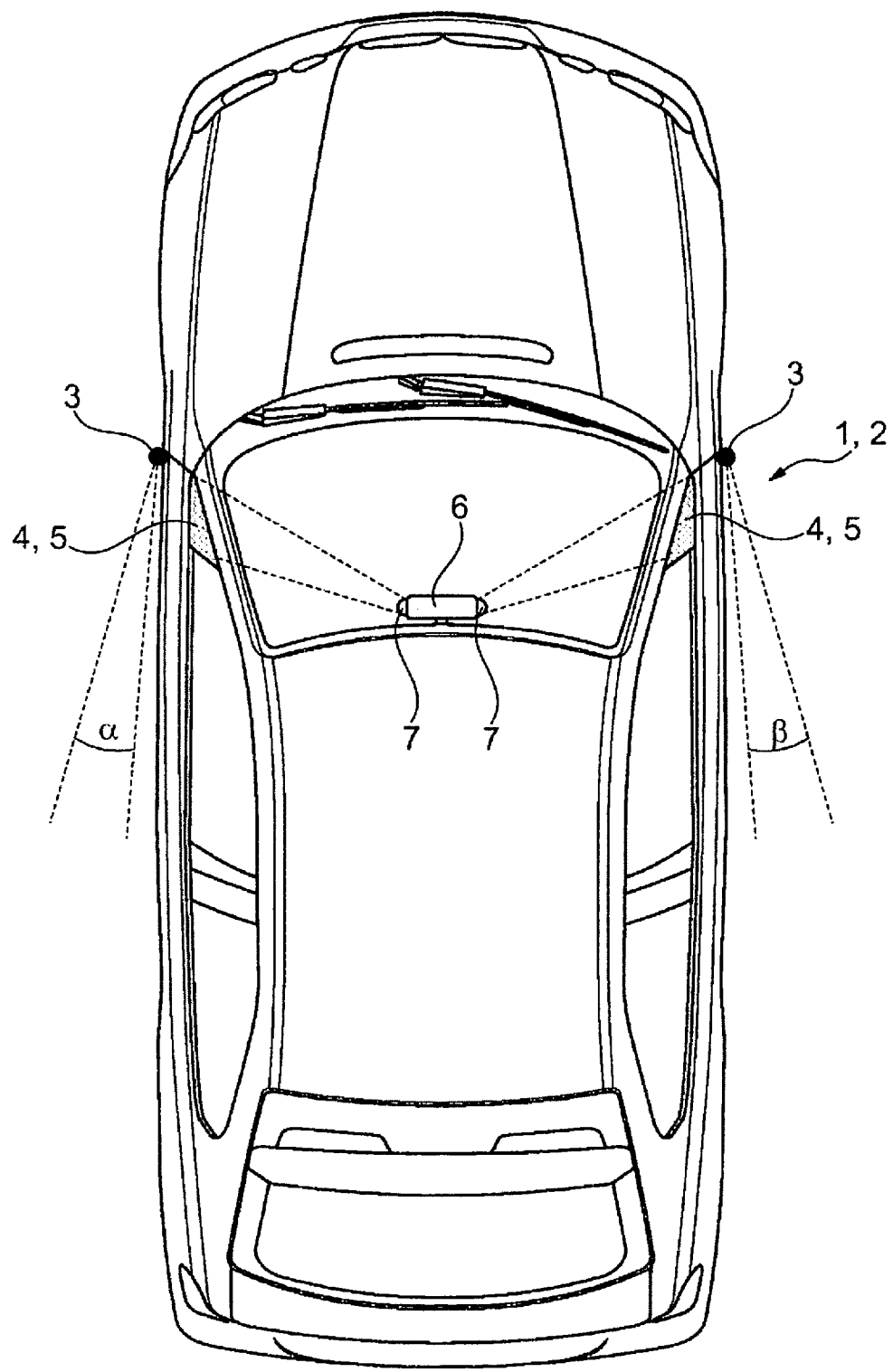
FIG. 1 shows a schematic plan view of a motor vehicle.

A monitoring device for a motor vehicle, intended to replace a conventional rear-view mirror of a motor vehicle, is known from DE 20 2005 015 407 U1. To this end, at least two cameras for observing the traffic behind are arranged in the rear region of the motor vehicle. The images or pictures of the camera are then transmitted into the interior of the motor vehicle and projected onto a side window by a projector. As an alternative, the side window may be coated with an image-transmitting film, onto which the images of the camera are transmitted. A drawback with this system is the fact that the images displayed to the driver correspond to those of the internal mirror. Images laterally behind the vehicle, on the other hand, are not made available.

To solve this problem, DE 10 2012 002 582 A1, which corresponds to the species, discloses a monitoring device for optimal monitoring of a rear space located behind a driver of the motor vehicle. The monitoring device comprises a camera device, with which an image of the rear space can be acquired, and a display surface with which the image of the rear space can be represented to the driver of the motor vehicle. The display surface is arranged parallel or at an acute angle to a side window of the motor vehicle, at a distance therefrom and outside the vehicle interior bounded by the side window. In this case, the lateral region of the motor vehicle is acquired and displayed, so that the imaging corresponds to that of a conventional exterior mirror.

The disclosed embodiments provide a monitoring device of the species.

To this end, the monitoring device for a motor vehicle comprises at least one camera device and a display surface, the camera device being arranged and configured in such a way that a lateral region of the motor vehicle is acquired. The lateral region is in this case selected in such a way that it corresponds at least to the region of a conventional exterior mirror. In addition, it may also include the so-called dead angle. The monitoring device is furthermore configured in such a way that the pictures of the camera device are represented on the display. In this case, the pictures are projected by projection optics onto a side window of the motor vehicle or are represented on a display on or in the side window. In this way, the aerodynamically unfavorable display surface outside the vehicle can be obviated, the visual impression being that of a conventional exterior mirror. The display surface is in this case arranged in the region of the side window through which the driver would look at a conventional exterior mirror. The camera device is in this case arranged in the region where the base of an exterior mirror would be arranged.

The projection optics are arranged inside the motor vehicle, as described in DE 20 2005 015 407 U1. One problem with projection optics is to ensure that the beam path is not perturbed.

The display surface is therefore configured as a display. The data transmission from the camera device to the display may in this case be wireless or wired.

In at least one disclosed embodiment, the display is configured as a film which is applied onto the inner side of the side window. The benefit is on the one hand protection against vandalism, and on the other hand easy retrofitting of conventional side windows.

As an alternative, the display may also be integrated into the side window, the display may be configured as an OLED display. The benefit of OLEDs is that they are suitable for integration. When the OLEDs are not activated, they are transparent.

In another disclosed embodiment, a camera device and a display surface are assigned to each lateral region of the motor vehicle, so that both exterior mirrors can be obviated.

In another disclosed embodiment, the viewing direction of the camera device and/or the aperture angle of the camera device is adjustable. In this way, the driver can adjust the viewing direction as in the case of a known exterior mirror, or adapt the acquisition region of the camera device according to his requirements.

In another disclosed embodiment, the monitoring device is configured in such a way that the position of the representation of the pictures of the camera device on the side window is adapted automatically as a function of a sitting position and/or of the viewing direction of the camera device and/or of the aperture angle of the camera device. In this way, the pictures are represented where the driver would expect them in the case of a conventional exterior mirror. The adjustment is carried out by a suitable actuator system, which can be operated from the interior of the vehicle.

In another disclosed embodiment, the monitoring device has at least one further display surface, the monitoring device being configured in such a way that the pictures of the camera device can be represented on the first display surface and/or the second display surface. The driver can therefore selectively view the pictures where it suits his situation better. The switching from the first to the second display surface and vice versa here may be carried out by manual input on an operating element or alternatively automatically, for example, to make the driver aware of an identified object. Likewise, both display surfaces may display the pictures simultaneously. For example, the further display surface may be arranged in an instrument cluster, or it may be a central display unit. As an alternative, the further display surface may also be configured as a head-up display, so that the pictures can be represented on the windshield.

FIG. 1 represents a motor vehicle 1 with a monitoring device 2. The monitoring device 2 has two camera devices 3 arranged laterally on the motor vehicle 1. In this case, the aperture angles α,β of the camera device 3 are represented by dashes, the angle bisector forming the viewing direction of the camera device 3. The monitoring device 2 furthermore has two side windows 4, which form the display surfaces 5 of the monitoring device 2. Projection optics 7, which project the pictures of the camera devices 3 onto the display surfaces 5, are arranged in a rear-view mirror 6. Instead of the rear-view mirror 6, the projection optics 7 may also be arranged in a roof module or at another suitable position, so long as it is ensured that there is an unimpeded beam path to the side window 4.

As an alternative, the side window 4 may also be configured with a display, for example, an OLED display, which is applied as a film onto the side window 4 or is integrated into the side window 4. The camera device 3 in this case aerodynamically presents only an extremely small air resistance.

Figure 2:
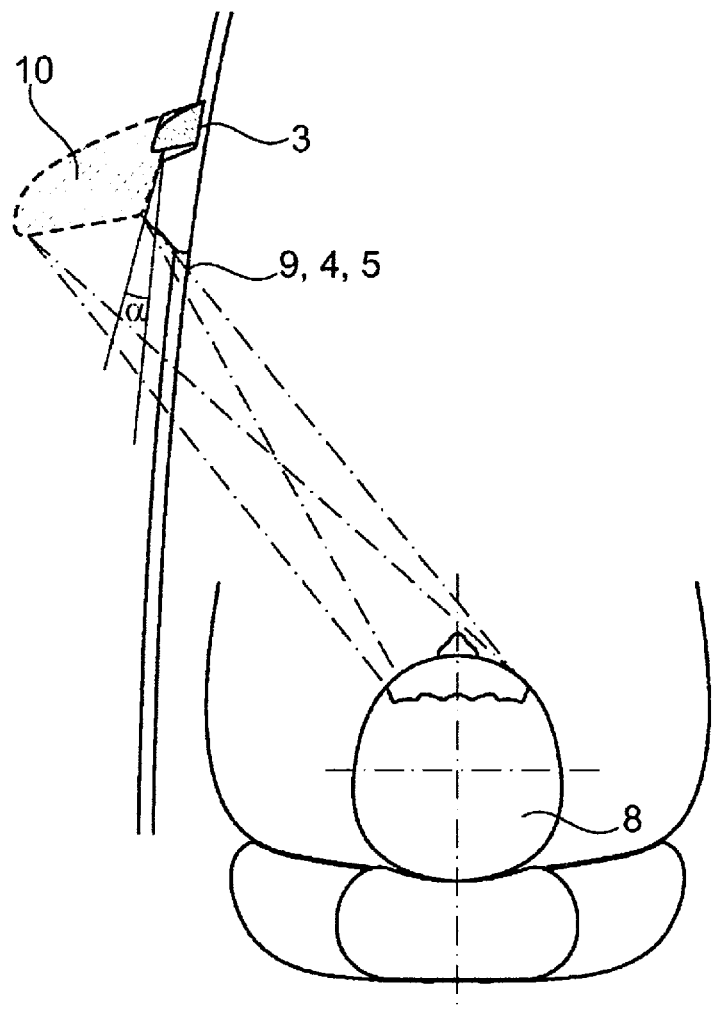
FIG. 2 shows a schematic representation of the view of a driver.

FIG. 2 represents the view of a driver 8 of a display surface 5 configured as a display 9, the display 9 being integrated into the side window 4. A virtual exterior mirror 10 is in this case represented by dashes. The display 9 is in this case arranged in such a way that the view at the display 9 would correspond to looking at a real exterior mirror. Provision may in this case also be made that a border of an exterior mirror is added to the pictures of the camera device 3, so that the representation visually corresponds to that of a real exterior mirror for the driver 8.

Since the region of the side window 4 through which the driver 8 would look at an exterior mirror depends on the sitting position, provision may be made for the position of representation on the display 9 to be controlled. To this end, for example, the display 9 is configured to be larger, a part of the side window 4 through which the driver 8 would look being determined with the aid of the sitting position, the display 9 being operated in this part to represent the pictures, the rest of the display 9 remaining transparent. The larger display 9 may, however, also be used simply to represent the pictures on a larger scale.

The invention claimed is:

1. A monitoring device for a transportation vehicle, the monitoring device comprising:
   at least one camera coupled to the transportation vehicle and configured to capture image data providing images of a lateral region of the exterior of the transportation vehicle, wherein the at least one camera is positioned relative to the transportation vehicle such that a viewing direction of the at least one camera is toward the lateral region of the exterior of the transportation vehicle; and
   at least one display surface provided by an electronic display arranged on or in a transparent side window of the transportation vehicle, wherein the electronic display receives the image data from the at least one camera, wherein the electronic display electronically produces a representation of the lateral region of the exterior of the transportation vehicle based on the received image data, whereby the representation of the lateral region of the transportation vehicle is displayed for viewing by the driver of the transportation vehicle so as to function as a virtual exterior mirror of the transportation vehicle,
   wherein the viewing direction and/or an aperture angle of the at least one camera is adjustable;
   wherein a relative position of the representation of the lateral region of the exterior of the transportation vehicle on the at least one display surface is adjusted automatically based on a sitting position of the driver of the transportation vehicle and/or of the viewing direction of the camera and/or of an aperture angle of the camera, and
   wherein an exterior mirror border is added to the representation of the lateral region of the exterior transportation vehicle on the transparent side window of the transportation vehicle so that the representation visually corresponds to that which would have been provided by a real exterior mirror for the driver.

2. The monitoring device of claim 1, wherein the electronic display includes a film which is applied onto an inner side of the transparent side window.

3. The monitoring device of claim 1, wherein the electronic display is integrated into the transparent side window.

4. The monitoring device of claim 3, wherein the electronic display is an OLED display.

5. The monitoring device of claim 1, wherein the at least one camera includes a first camera positioned on a first lateral side of the transportation vehicle and a second camera positioned on an opposite second lateral side of the transportation vehicle, and wherein the at least one display surface-includes a first display surface provided by the electronic display and a second display surface provided by a second display, wherein the first display surface is arranged along the first lateral side of the transportation vehicle and the second display surface is arranged along the second lateral side of the transportation vehicle.

6. The monitoring device of claim 1, wherein the monitoring device provides at least one further display surface, wherein representations of the lateral region of the exterior transportation vehicle are represented on one or all of the display surfaces.

7. A transportation vehicle comprising:
   at least one camera coupled to the transportation vehicle and configured to capture image data providing images of a lateral region of the exterior of the transportation vehicle, wherein the at least one camera is positioned relative to the transportation vehicle such that a viewing direction of the at least one camera is toward the lateral region of the exterior of the transportation vehicle;
   a transparent side window; and
   at least one display surface provided by an electronic display arranged on or in the transparent side window, wherein the electronic display receives the image data from the at least one camera, wherein the electronic display electronically produces a representation of the lateral region of the exterior of the transportation vehicle based on the received image data, whereby the representation of the lateral region of the transportation vehicle is displayed for viewing by the driver of the transportation vehicle,
   wherein the viewing direction and/or an aperture angle of the at least one camera is adjustable;
   wherein a relative position of the representation of the lateral region of the exterior of the transportation vehicle on the at least one display surface is adjusted automatically based on a sitting position of the driver of the transportation vehicle and/or of the viewing direction of the camera and/or of an aperture angle of the camera, and
   wherein an exterior mirror border is added to the representation of the lateral region of the exterior transportation vehicle on the transparent side window of the transportation vehicle so that the representation visually corresponds to that which would have been provided by a real exterior mirror for the driver.

8. The transportation vehicle of claim 7, wherein the electronic display includes a film which is applied onto an inner side of the transparent side window.

9. The transportation vehicle of claim 7, wherein the electronic display is integrated into the transparent side window.

10. The transportation vehicle of claim 9, wherein the electronic display is an OLED display.

11. The transportation vehicle of claim 7, wherein the at least one camera includes a first camera positioned on a first lateral side of the transportation vehicle and a second camera positioned on an opposite second lateral side of the transportation vehicle, and wherein the at least one display surface-includes a first display surface provided by the electronic display and a second display surface provided by a second display, wherein the first display surface is arranged along the first lateral side of the transportation vehicle and the second display surface is arranged along the second lateral side of the transportation vehicle.

12. The transportation vehicle of claim 7, wherein the monitoring device provides at least one further display surface, wherein representations of the lateral region of the exterior transportation vehicle are represented on one or all of the display surfaces.

13. The monitoring device of claim 1, wherein the electronic display is transparent.

14. The monitoring device of claim 13, wherein the position of the representation of the lateral region of the exterior transportation vehicle is adjustable to different portions of the electronic display with the rest of the electronic display remaining transparent.

15. The transportation vehicle of claim 7, wherein the electronic display is transparent.

16. The transportation vehicle of claim 15, wherein the position of the representation of the lateral region of the exterior transportation vehicle is adjustable to different portions of the electronic display with the rest of the electronic display remaining transparent.

* * * * *